(12) United States Patent
Maucksch et al.

(10) Patent No.: US 7,516,373 B2
(45) Date of Patent: *Apr. 7, 2009

(54) METHOD FOR TESTING THE ERROR RATIO OF A DEVICE USING A PRELIMINARY PROBABILITY

(75) Inventors: Thomas Maucksch, Tuntenhausen (DE); Uwe Baeder, Ottobrunn (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 513 days.

This patent is subject to a terminal disclaimer.

(21) Appl. No.: 10/513,909

(22) PCT Filed: Jan. 31, 2003

(86) PCT No.: PCT/EP03/00970

§ 371 (c)(1),
(2), (4) Date: Jun. 23, 2005

(87) PCT Pub. No.: WO03/096601

PCT Pub. Date: Nov. 20, 2003

(65) Prior Publication Data

US 2006/0002460 A1    Jan. 5, 2006

(30) Foreign Application Priority Data

May 8, 2002    (EP) .................................. 02010465

(51) Int. Cl.
*G06F 11/00* (2006.01)
(52) U.S. Cl. .................... 714/704; 714/742; 714/799
(58) Field of Classification Search .................. 714/704, 714/724, 736, 742, 708, 798
See application file for complete search history.

(56) References Cited

U.S. PATENT DOCUMENTS

| 5,325,397 A | 6/1994 | Scholz et al. |
| 5,396,059 A * | 3/1995 | Yeates ................ 250/214 C |
| 5,606,563 A | 2/1997 | Dorbolo et al. |

(Continued)

OTHER PUBLICATIONS

Dudewicz, E., et al. "Modern Mathematical Statistics," John Wiley & Sons, New York, pp. 514-526.

(Continued)

*Primary Examiner*—Esaw T Abraham
(74) *Attorney, Agent, or Firm*—Christensen O'Connor Johnson Kindness PLLC

(57) ABSTRACT

A method for testing the (Bit) Error Ratio BER of a device against a maximal allowable (Bit) Error Ratio $BER_{limit}$ with an early pass and/or early fail criterion, whereby the early pass and/or early fail criterion is allowed to be wrong only by a small probability F for the entire test. Ns bits of the output of the device are measured, thereby ne erroneous bits of these ns bits are detected. $PD_{high}$ and/or $PD_{low}$ are obtained, whereby $PD_{high}$ is the worst possible likelihood distribution and $PD_{low}$ is the best possible likelihood distribution containing the measured ne erroneous bits with a single step wrong decision probability D, which is smaller than the probability F for the entire test. The average numbers of erroneous bits $NE_{high}$ and $NE_{low}$ for $PD_{high}$ and $PD_{low}$ are obtained. $NE_{high}$ and $NE_{low}$ are compared with $NE_{limit}=BER_{limit}$ ns. If $NE_{limit}$ is higher than $NE_{high}$ or $NE_{limit}$ is lower than $NE_{low}$ the test is stopped. Sequential sampling with two one-tailed parametric hypothesis test for the poisson distribution.

13 Claims, 3 Drawing Sheets

U.S. PATENT DOCUMENTS

Figure 1:
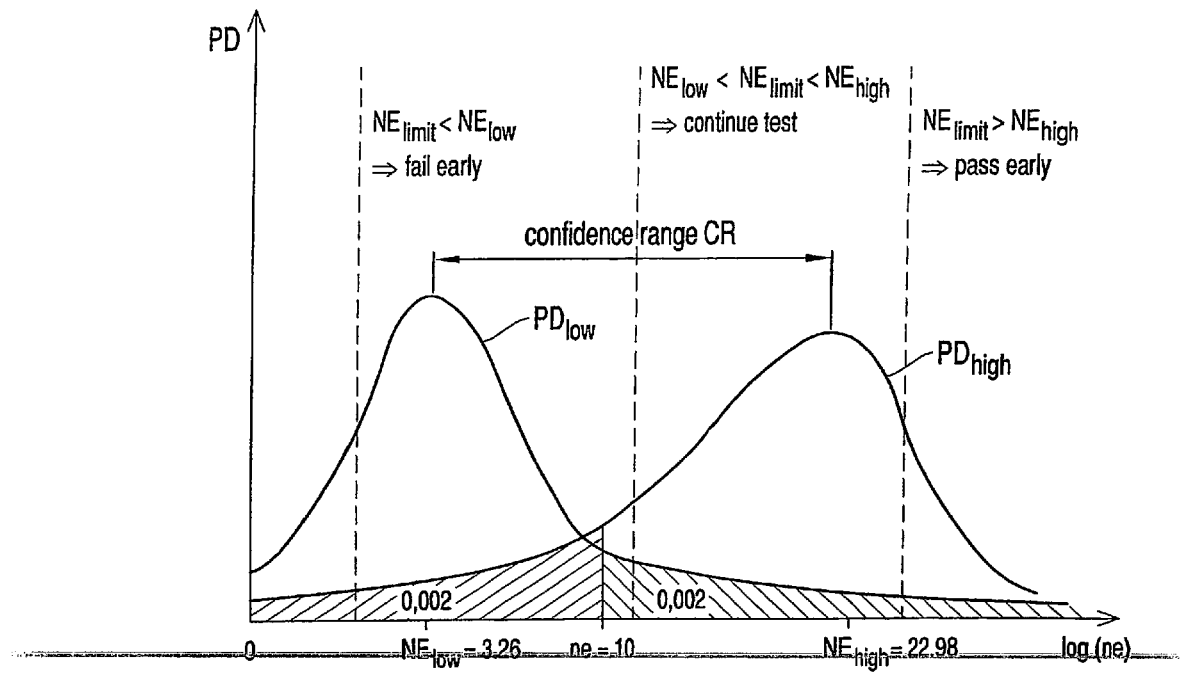

| | | | |
|---|---|---|---|
| 6,161,209 A * | 12/2000 | Moher | 714/780 |
| 6,216,095 B1 * | 4/2001 | Glista | 702/117 |
| 6,526,531 B1 * | 2/2003 | Wang | 714/704 |
| 2006/0002460 A1 * | 1/2006 | Maucksch et al. | 375/227 |

OTHER PUBLICATIONS

"HFTA-05.0: Statistical Confidence Levels for Estimating BER Probability," *Dallas Semiconductor/MAXIM*, Oct. 26, 2000, pp. 1-7.

Palacharla, P., et al. "Techniques for Accelerated Measurement of Low Bit Error Rates in Computer Data Links," *Proceedings of the IEEE Fourteenth Annual International Phoenix Conference on Computer Communications*, Scottsdale, Arizona, Mar. 28-31, 1995, pp. 184-190.

Wolaver, D.H., "Measure Error Rates Quickly and Accurately," *Electronic Design.* 43(11): pp. 89-90, 92, 95-98.

* cited by examiner

US 7,516,373 B2

METHOD FOR TESTING THE ERROR RATIO OF A DEVICE USING A PRELIMINARY PROBABILITY

The application is related to testing the (Bit) Error Ratio of a device, such as a digital receiver for mobile phones.

Concerning the state of the art, reference is made to U.S. Pat. No. 5,606,563. This document discloses a method of determining an error level of a data channel comprised of receiving channel parity error data indicating when bit errors occur within a set of data carried on the channel (channel error events), successively integrating the channel error events data over successive accumulation periods, comparing the integrated channel error events data with a threshold, and indicating an alarm in the event the integrated channel error events data exceeds the threshold.

Testing digital receivers is two fold: The receiver is offered a signal, usually accompanied with certain stress conditions. The receiver has to demodulate and to decode this signal. Due to stress conditions the result can be partly erroneous. The ratio of erroneously demodulated to all demodulated bits is measured in the Error Ratio test. The Bit Error Ratio BER test or more general any error rate test, for example Frame Error Ratio FER, Block Error Ratio BLER each comprising a Bit Error test, is subject of this application.

BER testing is time consuming. This is illustrated by the following example: a frequently used BER limit is 0.001. The bitrate frequently used for this test is approx. 10 kbit/s. Due to statistical relevance it is not enough to observe 1 error in 1000 bits. It is usual to observe approx. 200 errors in 200 000 bits. This single BER test lasts 20 seconds. There are combined tests which contain this single BER test several times, e.g. the receiver blocking test. Within this test the single BER test is repeated 12750 times with different stress conditions. Total test time here is more than 70 h. It is known in the state of the art to fail the DUT (Device Under Test) early only, when a fixed number of errors as 200 errors are observed before 200 000 bits are applied. (Numbers from the example above).

It is the object of the present application to propose a method for testing the Bit Error Ratio of a device with reduced test time, preserving the statistical relevance.

The object is solved by the features of claim 1 or claim 5.

According to the present invention, the worst possible likelihood distribution $PD_{high}$ and/or the best possible likelihood distribution $PD_{low}$ are obtained by the formulas given in claim 1 and 5, respectively. From these likelihood distributions, the average number $NE_{high}$ or $NE_{low}$ is obtained and compared with the limit $NE_{limit}$, respectively. If the limit $NE_{limit}$ is higher than the average number $NE_{high}$ or smaller than the average number $NE_{low}$, the test is stopped and it is decided that the device has early passed or early failed, respectively. During the test a single step wrong decision probability for a preliminary BER stage is used, which is smaller than the probability for the entire test.

The dependent claims contain further developments of the invention.

The Poisson distribution preferably used for the present invention, is best adapted to the BER problem. The nature of the Bit Error occurrence is ideally described by the binomial distribution. This distribution, however, can only be handled for small number of bits and errors. For a high number of bits and a low Bit Error Ratio the binomial distribution is approximated by the Poisson distribution. This prerequisite (high number of bits, low BER) is ideally fulfilled for normal Bit Error Rate testing (BER limit 0.001) as long as the DUT is not totally broken (BER 0.5). The application proposes to overcome problems with the discrete nature of the Poisson distribution. With the same method an early pass condition as well as an early fail condition is derived.

An embodiment of the invention is described hereafter. In the drawings

Figure 2:
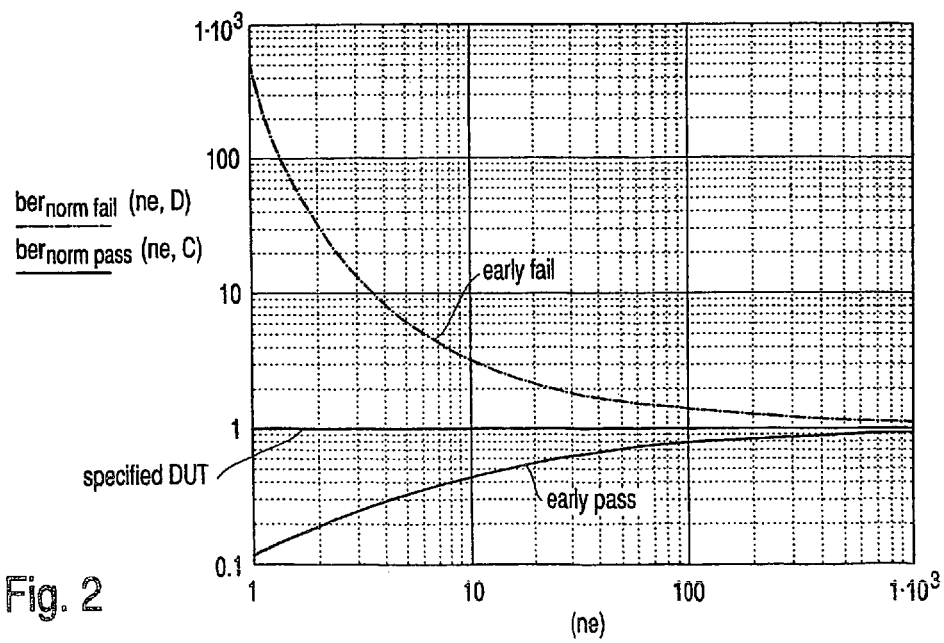
Figure 3:
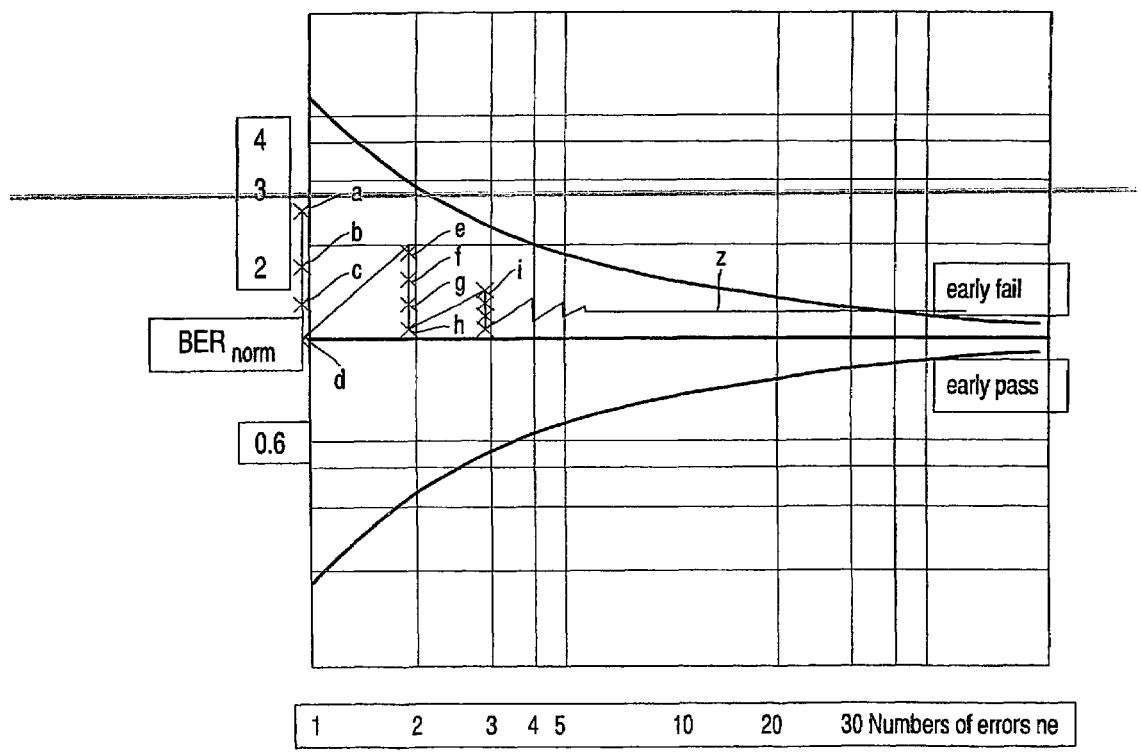
Figure 4:
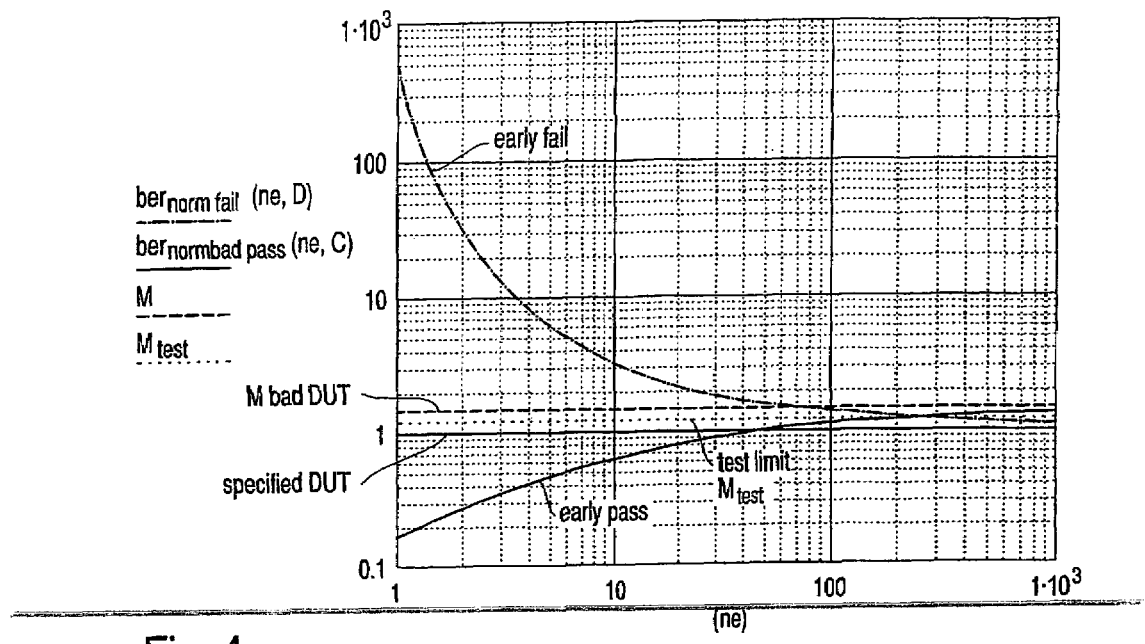
Figure 5:
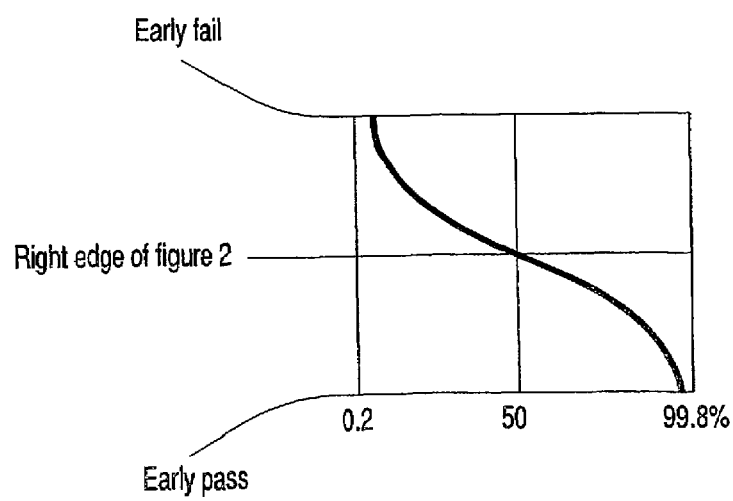

FIG. 1 shows a diagram to illustrate the inventive method,

FIG. 2 shows the referenced Bit Error Ratio $ber_{norm}$ as a function of the measured errors ne, FIG. 3 shows a diagram to illustrate a measurement using a first embodiment of the inventive method, FIG. 4 shows a diagram to illustrate a measurement using a second embodiment of the inventive method and FIG. 5 shows a diagram illustrating the position at the end of the test using the first embodiment of the inventive method as a function of probability.

In the following, a test procedure together with the early fail condition and the early pass condition is derived with mathematical methods.

The BER test procedure is an iterative process: The number of samples and the number of errors are accumulated from the beginning of the test to calculate a preliminary BER ((Bit) Error Ratio). Samples up to the next error are used together with the past samples to calculate the next preliminary BER. Every preliminary BER is tested against an early pass or early fail bound. The formulas to derive an early pass or early fail condition contain a single step wrong decision probability D. This is valid only for one specific preliminary BER stage. However, it is meaningful to have a wrong decision probability F for the entire test (F>D). The application proposes to use a single step wrong decision probability D, which is smaller than the probability for the entire test and proposes a method to derive D from a given F.

Due to the nature of the test, namely discrete error events, the early stop conditions are declared not valid, when fractional errors <1 are used to calculate the early stop limits. The application contains proposals, how to conduct the test at this undefined areas. The proposals are conservative (not risky). A DUT on the limit does not achieve any early stop condition. The application proposes to stop the test unconditioned at a specific number K (for example 200 bit) errors. As this proposal contains a pseudo paradox, an additional proposal to resolve this pseudo paradox is appended.

Based on a measurement at a preliminary BER stage (pBs), a confidence range CR around this measurement is derived. It has the property that with high probability the real result can be found in this range.

The confidence range CR is compared with the specified BER limit. From the result a diagram is derived containing the early fail and the early pass condition.

With a finite number of samples ns of measured bits, the final Bit Error Ratio BER cannot be determined exactly. Applying a finite number of samples ns, a number of errors ne is measured. ne/ns=ber is the preliminary Bit Error Ratio.

In a test at a preliminary BER stage (pBs) a finite number of measured bits ns is applied, and a number of errors ne is measured. ne is connected with a certain differential probability in the Poisson distribution. The probability and the position in the distribution conducting just one test at a preliminary BER stage (pBs) is not known.

Repeating this test infinite times up to this preliminary BER stage, applying repeatedly the same ns, the complete Poisson distribution is obtained. The average number (mean value) of errors is NE. NE/ns is the real BER at the DUT. The Poisson distribution has the variable ne and is characterised by the parameter NE, the average or mean value. Real probabilities to find ne between two limits are calculated by integrating between such limits. The width of the Poisson distribution increases proportional to SQR(NE), that means, it increases absolutely, but decreases relatively.

In a test at a preliminary BER stage (pBs) ns samples are applied and ne errors are measured. The result can be a member of different Poisson distributions each characterized by another parameter NE. Two of them are given as follows:

The worst possible distribution $NE_{high}$, containing the measured ne with the probability $D_1$, is given by $$D_1 = \int_0^{ne} PD_{high}(NE_{high}, ni) \, dni \quad (1)$$

In the example $D_1$ is 0.002=0.2% $PD_{high}$ is the wanted Poisson distribution with the variable ni. ne is the measured number of errors.

The best possible distributions $NE_{low}$, containing the measured ne with the probability $D_2$ is given by $$D_2 = \int_{ne}^{\infty} PD_{low}(NE_{low}, ni) \, dni \quad (2)$$

In the example $D_2$ is equal $D_1$ and it is $D=D_1=D_2=0.002=0.2\%$.

To illustrate the meaning of the range between $NE_{low}$ and $NE_{high}$ refer to FIG. 1. FIG. 1 shows the likelihood density PD as a function of the measured number of errors ne. In the example, the actual detected number of errors ne within the measured sample of ns bits is 10. The likelihood distribution of the errors is not known. The worst possible likelihood distribution $PD_{high}$ under all possible likelihood distributions as well as the best possible likelihood distribution $PD_{low}$ under all possible likelihood distributions are shown. The worst possible likelihood distribution $PD_{high}$ is characterized in that the integral from 0 to ne=10 gives a total probability of $D_1$=0.002. The best possible likelihood distribution $PD_{low}$ is characterized in that the integral from ne=10 to ∞ gives a total probability of $D_2$=0.002. In the preferred embodiment $D_1$ is equal to $D_2$, i.e. $D_1=D_2=0.002=0.2\%$. After having obtained the likelihood distribution $PD_{high}$ and $PD_{low}$ from formulas (1) and (2), the average values or mean values $NE_{high}$ for the likelihood distribution $PD_{high}$ and $NE_{low}$ for the likelihood distribution $PD_{low}$ can be obtained. The range between the mean value $NE_{low}$ and $NE_{high}$ is the confidence range CR indicated in FIG. 1.

In the case the measured value ne is a rather untypical result (in the example just 0.2% probability) nevertheless the real result NE can still be found in this range, called confidence range CR.

The probabilities $D_1$ and $D_2$ in (1) and (2) can be independent, but preferable they are dependent and equal ($D=D_1=D_2$)

For the Poisson distribution $NE_{low}$ and $NE_{high}$ can be obtained. With the formulas (3) and (4) respectively the inputs are the number of errors ne, measured in this test and the probabilities D and C=1−D. The Output is NE, the parameter describing the average of the Poisson distribution.

The following example is illustrated in FIG. 1 (D=$D_1$=$D_2$):

$$NE_{low} = \frac{qchisq(D, 2 \cdot ne)}{2} \quad (3)$$

$$NE_{high} = \frac{qchisq(C, 2(ne+1))}{2} \quad (4)$$

Example:
Number of errors: ne=10
Probability: D=0.002 C=0.998

Result:
$NE_{low}$=3.26
$NE_{high}$=22.98
Interpretation:

Having measured ne=10 errors in a test with preliminary BER stage (pBs), then at a low probability D=0.002 the average number of errors NE in this test is outside the range from 3.26 to 22.98 or with a high probability C=0.998 inside this range from 3.26 to 22.98.

Such as the width of the Poisson distribution, the confidence range CR increases proportional to SQR(ne), that means, it increases absolutely, but decreases relatively.

If the entire confidence range CR, calculated from a single result ne, is found on the good side ($NE_{limit}$>$NE_{high}$) of the specified limit $NE_{limit}$ we can state: With high probability C, the final result NE is better than the limit $NE_{limit}$. Whereby $NE_{limit}$ is given by $$NE_{limit} = BER_{limit} \cdot ns \quad (5)$$

and $BER_{limit}$ is the Bit Error Rate allowable for the device and obtained by an ideal long test with an infinite high number of bit samples ns.

If the entire confidence range CR, calculated from a single result ne, is found on the bad side ($NE_{limit}$<$NE_{low}$) of the specified limit $NE_{limit}$ we can state: With high probability C, the final result NE is worse than the limit.

With each new sample and/or error a new test is considered, reusing all former results. With each new test the preliminary data for ns, ne and ber is updated. For each new test the confidence range CR is calculated and checked against the test limit $NE_{limit}$.

Once the entire confidence range CR is found on the good side of the specified limit ($NE_{limit}$>$NE_{high}$), an early pass is allowed. Once the entire confidence range CR is found on the bad side of the specified limit ($NE_{limit}$<$NE_{low}$) an early fail is allowed. If the confidence range CR is round on both sides of the specified limit ($NE_{limit}$<$NE_{limit}$<$NE_{high}$), it is evident neither to pass nor to fail the DUT early.

FIG. 1 illustrates the above conditions. Of course, $NE_{limit}$ is a fixed value not altering during the test, but $NE_{low}$ and $NE_{high}$ as well as the confidence range CR are altering during the test. For reasons of illustration, however, the three possibilities of the possible positions of the confidence range CR with respect to the constant limit $NE_{limit}$ are drawn for the same example in FIG. 1.

The above can be described by the following formulas:

The current number of samples ns is calculated from the preliminary Bit Error Ratio ber and the preliminary number of errors ne $$ber = ne/ns \quad (6)$$

The specified BER expressed with number of samples ns and number of Errors NE is $$BER_{limit} = NE_{limit}/ns \quad (7)$$

for abbreviation in the formula:

$$ber_{norm} = ber/BER_{limit} = ne/NE_{limit}$$

(normalised ber) $\quad (8)$

Early pass stipulates:

$$NE_{high} < NE_{limit} \quad (9)$$

Early fail stipulates:

$$NE_{low} > NE_{limit} \quad (10)$$

Formula for the early pass limit:

$$ber_{norm} = \frac{ne}{NE_{high}} \quad (11)$$

This is the lower curve (bernorm$_{pass}$ (ne, C)) in FIG. 2, which shows ber$_{norm}$ as a function of ne.

Formula for the early fail limit:

$$ber_{norm} = \frac{ne}{NE_{low}} \quad (12)$$

This is the upper curve (bernorm$_{fail}$ (ne, D)) in FIG. 2.

As the early pass limit is not defined for ne=0 (normally the case at the very beginning of the test for a good DUT), an artificial error event with the first sample can be introduced. When the first real error event occurs, the artificial error is replaced by this real one. This gives the shortest possible measurement time for an ideal good DUT. For example ns=5000 for BER$_{limit}$=0.001 and probability D=D$_1$=D$_2$=0.2%.

As the early fail limit uses NE$_{low}$<1 for small ne<k (in the example below k=5) due to a decision problem at a fractional error, the early fail limit at ne=k is extended with a vertical line upwards. This ensures that a broken DUT hits the early fail limit in any case after a few samples, approx. 10 in the example. In other words, the test is not stopped as long as ne is smaller than k.

With each new sample and/or error a new test is considered, reusing all former results. With each new test the preliminary data for ns, ne and ber and bernorm are updated and a ber$_{norm}$/ne coordinate is entered into the ber$_{norm}$-diagram. This is shown in FIG. 3. Once the trajectory crosses the early fail limit (ber$_{norm}$ (ne,D)) or the early pass limit (ber$_{norm}$ (ne,C)) the test may be stopped and the conclusion of early fail or early pass may be drawn based on this instant.

FIG. 3 shows the curves for early fail and early pass. ber$_{norm}$ is shown as a function of the number of errors ne. For the simple example demonstrated in FIG. 3, it is BER$_{limit}$=0.2=1/5 and the final Bit Error Ratio BER=0.25 (1/4). The test starts with the first bit sample, for which no error is detected. For the second sample, a first error is detected and the preliminary Bit Error Ratio ber=ne/ns=1/2 and ber$_{norm}$=ber/BER$_{limit}$ becomes 1/2 : 1/5=5/2. ber$_{norm}$ after the second sample is marked with a cross a in FIG. 3. For the third, fourth and fifth sample, no further error occurs and ber$_{norm}$ subsequently becomes 5/3, 5/4 and 5/5, respectively, which is marked with the crosses b, c and d in FIG. 3, respectively. The sixth sample brings a new error and ne becomes 2. Consequently, ber=ne/ns becomes 2/6 and bernorm becomes 10/6. This situation is marked with cross e in FIG. 3. For the seventh, eighth and ninth sample, no further error occurs and the situation after the seventh, eighth and ninth sample is marked with crosses f, g, h in FIG. 3, respectively. The tenth sample brings a third error. Consequently, ber becomes 3/10 and ber$_{norm}$ becomes 15/10. This situation is marked with cross i in FIG. 3. As can be seen from FIG. 3, the trajectory is between the early fail curve and the early pass curve at the beginning of the test, but converges to a line Z, which crosses the early fail curve after about forty errors. After forty errors, it can thus be decided that the tested DUT early fails the test.

If no early stop occurs the BER test may be stopped, after the following condition is valid:

$$ne \geq K \quad (13)$$

and the DUT shall be passed, if ns is sufficiently high. K is a maximum number of errors. For example K can be 200.

If the trajectory neither crosses the early fail curve nor the early pass curve after K (for example 200) errors have occurred, the DUT can be finally passed. If the DUT, however, is rather good or rather bad, the tests can be stopped much earlier, long before the K=200 errors have occurred. This significantly shortens the total test time.

In the above embodiment early fail means: a DUT, which survived to certain preliminary BER stage, is failed and a probability of 0.2% that it is actually better than the limit is accepted. Further early pass means: the DUT, which survived to certain preliminary BER stage, is passed and a probability of 0.2% that it is actually worse than the limit is accepted. If the test is stopped at 200 errors the DUT is passed without any early fail or early pass condition arbitrarily. It can cross the vertical 200 error line in FIG. 2 at different heights, each height is connected with a certain statistical interpretation: The probability to have a DUT better (worse) than the limit is indicated in FIG. 5. The vertical in FIG. 5 shows the position in FIG. 2 at the end of the test. The horizontal in FIG. 5 shows the respective probability.

This embodiment contains a pseudo paradox, due to statistical nature of the test and limited test time, demonstrated with the following example: A DUT, which is early failed, would pass if the probability for a wrong decision has been reduced by widening the early stop limits, or vice versa, if the test is stopped at 200 errors and the DUT is arbitrarily failed. A DUT, which is early passed, would fail if the probability for a wrong decision has been reduced.

The following embodiment resolves this pseudo paradox and additionally accelerates the test. This is done by a meaningful redefinition of the early pass limit maintaining the early fail limit. Early pass means now: A DUT, which survived to certain preliminary BER stage, is passed and a probability of 0.2% that it is actually worse than M times the specified limit (M>1) is accepted. This is a worse DUT limit. This shifts the early pass limit upwards in FIG. 2 as shown in FIG. 4. Bernorm$_{pass}$ (ne, C) in FIG. 2 becomes bernormbad$_{pass}$ (ne, C) in FIG. 4. Bernorm$_{fail}$ (ne, D) remains unchanged. Now it is $$NE_{limit,M} = BER_{limit} \cdot M \cdot ns \quad (14)$$

and an early pass is allowed, if NE$_{limit}$·M=NE$_{limit,M}$>NE$_{high}$.

There are three high level parameters for the test:
Probability to make a wrong decision in a single step (proposal: D=0.2%)
Final stop (proposal: K=200 errors)
Definition of a Bad DUT (BER$_{limit}$·M)

These parameters are interdependent. It is possible to enter two of them and to calculate the third one. To make the test transparent, it is proposed to enter the single step wrong decision probability D and the final stop condition K and to derive the Bad DUT factor M. This is done in the following manner: The early pass limit is shifted upwards by a factor of M, such that the early fail and the early pass limit intersect at 200 errors in the example as shown in FIG. 4. FIG. 4 also shows the test limit obtained from the crossing point from the early fail curve and the easy pass curve, corresponding to M$_{test}$.

There are infinite possibilities to resolve the above mentioned paradox.

In the example above the open end between the limits was originally declared pass, and time was saved by multiplying the early pass limit with M (M>1), shifting it upwards such that the early fail and the early pass curve intersect at 200 errors (200: example from above). Such only a DUT, bad with high probability, is failed (customer risk)

The complementary method is: The open end between the limits is declared fail, and time is saved by multiplying the early fail limit with m (0<m<1), shifting it downwards, such that the early fail and the early pass curve intersect at 200 errors (200: example from above). Such only a DUT, good with high probability, is passed (manufacturer risk).

The compromise method is: The open end between the limits is partitioned in any ratio: the upper part is declared fail and the lower part is declared pass. Time is saved by multiplying the early fail limit with m (0<m<1) and such shifting it downwards and by multiplying the early pass limit with M (M>1) and such shifting it upwards. So the early fail and the early pass curve intersect at 200 errors (200: example from above).

With given $D_1$ and $D_2$ the early fail curve and the early pass curves in FIG. 3 and FIG. 2 or FIG. 4 can be calculated before the test is started. During the test only $ber_{norm} = ne/NE_{limit}$ has to be calculated and to be compared with the early pass limit and the early fail limit as explained with respect to FIG. 3 and FIG. 4. Thus, no intensive calculation has to be done during the test.

$D_1$ and $D_2$ above describe the single step wrong decision probability for a DUT, which survived without early stop to a certain preliminary BER stage. For a real test it is desirable to define in advance a wrong decision probability F for the entire test. For every step a fraction of DUTs leave the statistical totality due to single step wrong decision probability D. This accumulates to an amount F>D.

It is proposed to derive D from F by the following method:

Based on statistical independency, a large ensemble of DUTs with BER on the limit (limit DUT) and with M*BER (bad DUT) is simulated and the entire test for the limit DUT ensemble and the bad DUT ensemble is run by simulation against the early pass and early fail bound, with a free D-parameter ($D_1$ and $D_2$). The simulation will show, that a certain fraction F (D<F<1) of the large ensemble falsely fails (limit DUT) or falsely passes (bad DUT). This represents the wrong decision probability F for the entire test. D is tuned such that F corresponds to the predefined wrong decision probability.

All methods above use approximations summarised below:

They use statistical independency even if not valid in any case.

The Poisson Distribution, used above, approximates the binomial distribution if BER is nearly zero (BER→0). It is possible and from numerical ease meaningful to use the Chi Square Distribution instead of Poisson Distribution. The continuous Chi Square Distribution is the interpolation of the discrete Poisson Distribution.

Once a DUT leaves the statistical totality due to early fail or early pass, the subsequent distribution is changed. In so far the initially selected distribution has its intended validity only at the beginning of the test. Due to early passes and early fails the distribution is trunked more and more towards the end of the test. These trunked distributions cannot be handled anymore analytically, and so it is impossible to derive D from F analytically. It is possible to derive each subsequent distribution by numerical methods. Then it is possible to derive D from F numerically. In the above proposed process, just a unique, the initial distribution is applied as approximation instead of a set of correct distributions. With a set of correct distributions it is possible to calculate D from F by:

$$F = 1 - (1-D)^{ne} \quad (15)$$

Generally it can be assumed:

$$F > D \geq 1 - (1-F)^{1/ne} \quad (16)$$

This formula can serve as an infimum for D, if the method is based on simulation using the initial distribution.

The invention claimed is:

1. A method for testing a bit error ratio (BER) of a device against a maximal allowable Error Ratio $BER_{limit}$ with an early pass criterion, whereby the early pass criterion is allowed to be wrong only by a small probability $F_1$ for the entire test, comprising the following steps:

measuring ns bits of the output of the device, thereby detecting ne erroneous bits of these ns bits;

assuming that a likelihood distribution giving the distribution of the number of erroneous bits ni in a fixed number of samples of bits is PD(NE,ni), wherein NE is an average number of erroneous bits, obtaining $PD_{high}$ from $$D_1 = \int_0^{ne} PD_{high}(NE_{high}, ni)\, dni$$

wherein $PD_{high}$ is the worst possible likelihood distribution containing the measured ne erroneous bits with a single step wrong decision probability $D_1$ for a preliminary Error Ratio BER stage, whereby using a single step wrong decision probability $D_1$ smaller than the probability $F_1$ for the entire test;

obtaining the average number of erroneous bits $NE_{high}$ for the worst possible likelihood distribution $PD_{high}$;

comparing $NE_{high}$ with $NE_{limit} = BER_{limit} ns$;

if $NE_{limit}$ is higher than $NE_{high}$ stopping the test and deciding that the device has early passed the test; and if $NE_{limit}$ is smaller than $NE_{high}$ continuing the test, thereby increasing ns.

2. A method for testing the bit error ratio (BER) according to claim 1, characterized in that the single step wrong decision probability $D_1$ is in a range of $$F_1 > D_1 \geq 1 - (1-F_1)^{1/ne}.$$

3. A method for testing bit error ratio (BER) according to claim 1, characterized in that the likelihood distribution PD(NE,ni) is a Poisson distribution.

4. A method for testing the bit error ratio (BER) according to claim 1, characterized in that for avoiding an undefined situation for ne=0 starting the test with an artificial error ne=1 not incrementing ne when a first error occurs.

5. A method for testing a bit error ratio (BER) of a device against a maximal allowable Error Ratio $BER_{limit}$ with an early fail criterion, whereby the early fail criterion is allowed to be wrong only by a small probability $F_2$ for the entire test, comprising the following steps;

measuring ns bits of the output of the device, thereby detecting ne erroneous bits of these ns bits;

assuming that a likelihood distribution giving the distribution of the number of erroneous bits ni in a fixed number of samples of bits is PD(NE,ni), wherein NE is an average number of erroneous bits, obtaining $PD_{low}$ from the $$D_2 = \int_{ne}^{\infty} PD_{low}(NE_{low}, ni)\, dni$$

wherein $PD_{low}$ is the best possible likelihood distribution containing the measured ne erroneous bits with a single step wrong decision probability $D_2$ for a preliminary Error Ratio BER stage, whereby using a single step wrong decision probability $D_2$ smaller than the probability $F_2$ for the entire test;

obtaining the average number of erroneous bits $NE_{low}$ for the best possible likelihood distribution $PD_{low}$;

comparing $NE_{low}$ with $NE_{limit}=BER_{limit}\cdot ns$;

if $NE_{limit}$ is smaller than $NE_{low}$ stopping the test and deciding that the device has early failed the test; and if $NE_{limit}$ is higher than $NE_{low}$ continuing the test, thereby increasing ns.

6. A method for testing the bit error ratio (BER) according to claim 5, characterized in that the single step wrong decision probability $D_2$ is in a range of $$F_2 > D_2 \geq 1-(1-F_2)^{1/ne}.$$

7. A method for testing the bit error ratio (BER) according to claim 5, characterized in that the likelihood distribution PD(NE,ni) is a Poisson distribution.

8. A method for testing the bit error ratio (BER) according to claim 5, characterized in that for avoiding a undefined situation for ne<k, wherein k is a small number of errors, not stopping the test as long as ne is smaller than k.

9. A method for testing the bit error ratio (BER) according to claim 8, characterized in that k is 5.

10. A method for testing the a bit error ratio (BER) according to claim 5, characterized by an additional early pass criterion, whereby the early pass criterion is allowed to be wrong only by a small probability $F_1$ for the entire test, comprising the following additional steps;

assuming that a likelihood distribution giving the distribution of the number of erroneous bits ni in a fixed number of samples of bits is PD(NE,ni), wherein NE is an average number of erroneous bits, obtaining $PD_{high}$ from $$D_1 = \int_0^{ne} PD_{high}(NE_{high}, ni)\, dni$$

wherein $PD_{high}$ is the worst possible likelihood distribution containing the measured ne erroneous bits with the single step wrong decision probability $D_1$ for a preliminary Error Ratio BER stage, whereby using a single step wrong decision probability $D_1$ smaller than the probability $F_1$ for the entire test;

obtaining the average number of erroneous bits $NE_{high}$ for the worst possible likelihood distribution $PD_{high}$;

comparing $NE_{high}$ with $NE_{limit}=BER_{limit}\cdot ns$;

if $NE_{limit}$ is higher than $NE_{high}$ stopping the test and deciding that the device has early passed the test; and if $NE_{limit}$ is smaller than $NE_{high}$ continuing the test, thereby increasing ns.

11. A method for testing the bit error ratio (BER) according to claim 10, characterized in that for avoiding a undefined situation for ne=0 starting the test with an artificial error ne=1 not incrementing ne when a first error occurs.

12. A method for testing the bit error ratio (BER) according to claim 10, characterized in that the probability $F_1$ for the wrong early pass criterion and the probability $F_2$ for the wrong early fail criterion are equal ($F_1=F_2$).

13. A method for testing the bit error ratio (BER) according to claim 5, characterized by an additional early pass criterion, whereby the early pass criterion is allowed to be wrong only by a small probability $F_1$ for the entire test, comprising the following additional steps:

assuming that a likelihood distribution giving the distribution of the number of erroneous bits ni in a fixed number of samples of bits is PD(NE,ni), wherein NE is an average number of erroneous bits, obtaining $PD_{high}$ from $$D_1 = \int_0^{ne} PD_{high}(NE_{high}, ni)\, dni$$

wherein $PD_{high}$ is the worst possible likelihood distribution containing the measured ne erroneous bits with the single step wrong decision probability $D_1$ for a preliminary Error Ratio BER stage, whereby using a single step wrong decision probability $D_1$ smaller than the probability $F_1$ for the entire test;

obtaining the average number of erroneous bits $NE_{high}$ for the worst possible likelihood distribution $PD_{high}$;

comparing $NE_{high}$ with $NE_{limit,M}=BER_{limit}\cdot M\cdot ns$, with M>1;

if $NE_{limit,M}$ is higher than $NE_{high}$ stopping the test and deciding that the device has early passed the test; and if $NE_{limit,M}$ is smaller than $NE_{high}$ continuing the test, thereby increasing ns.

* * * * *

UNITED STATES PATENT AND TRADEMARK OFFICE
CERTIFICATE OF CORRECTION

PATENT NO. : 7,516,373 B2 Page 1 of 1
APPLICATION NO. : 10/513909
DATED : April 7, 2009
INVENTOR(S) : T. Maucksch et al.

It is certified that error appears in the above-identified patent and that said Letters Patent is hereby corrected as shown below:

| COLUMN | LINE | ERROR |
|---|---|---|
| 8 (Claim 1, line 20 of text) | 29 | "$NE_{limit}=BER_{limit}ns;$" should read --$NE_{limit}=BER_{limit}\cdot ns;$-- |
| 8 (Claim 5, line 5 of text) | 50 | "steps;" should read --steps:-- |
| 9 (Claim 5, line 19 of text) | 3 | "$NE_{limit}=BER_{limit}ns;$" should read --$NE_{limit}=BER_{limit}\cdot ns;$-- |
| 9 (Claim 10, line 5 of text) | 26 | "steps;" should read --steps:-- |
| 10 (Claim 10, line 17 of text) | 1 | "$NE_{limit}=BER_{limit}ns;$" should read --$NE_{limit}=BER_{limit}\cdot ns;$-- |
| 10 (Claim 13, line 2) | 15 | "characterizedby" should read --characterized by-- |

Signed and Sealed this

Twenty-seventh Day of October, 2009

David J. Kappos
*Director of the United States Patent and Trademark Office*